(12) United States Patent
Liu

(10) Patent No.: US 9,158,609 B2
(45) Date of Patent: Oct. 13, 2015

(54) UNIVERSAL SERIAL BUS TESTING DEVICE

(71) Applicant: Quanta Computer Inc., Kuei Shan Hsiang, Tao Yuan Shien (TW)

(72) Inventor: Chien-Hung Liu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 163 days.

(21) Appl. No.: 14/023,760

(22) Filed: Sep. 11, 2013

(65) Prior Publication Data

US 2014/0304555 A1  Oct. 9, 2014

(30) Foreign Application Priority Data

Apr. 9, 2013  (TW) .............................. 102112455 A

(51) Int. Cl.
*G06F 11/00* (2006.01)
*G06F 11/07* (2006.01)
(52) U.S. Cl.
CPC .................................. *G06F 11/0745* (2013.01)
(58) Field of Classification Search
USPC .......................................................... 714/43
See application file for complete search history.

(56) References Cited

U.S. PATENT DOCUMENTS

| 2008/0021693 A1* | 1/2008 | Campbell et al. ................ 703/21 |
| 2012/0042178 A1* | 2/2012 | Ishii et al. ..................... 713/300 |
| 2013/0151898 A1* | 6/2013 | Hou ................................ 714/27 |
| 2014/0108870 A1* | 4/2014 | Aravindhan .................... 714/43 |

FOREIGN PATENT DOCUMENTS

TW  201235838  9/2012

OTHER PUBLICATIONS

Taiwanese language office action dated Feb. 25, 2015.
English language translation of abstract of TW 201235838 (published Sep. 1, 2012).

* cited by examiner

*Primary Examiner* — Sarai Butler
(74) *Attorney, Agent, or Firm* — McClure, Qualey & Rodack, LLP

(57) ABSTRACT

A USB testing device is provided for an electronic device having a USB port. The USB testing device includes a first USB control unit, a second USB control unit, and a microprocessor. When the first USB control unit has received power, the first USB control unit processes a connection test via a first data port. When the second USB control unit has received the power, the second USB control unit processes a connection test via a second data port. When the USB testing device is connected to the USB port, the micro-processor provides power to the first USB control unit. When the first USB control unit receives power, the first USB control unit provides power to the second USB control unit after waiting for a predetermined period of time. The electronic device determines whether the first and second data ports are operating properly.

10 Claims, 3 Drawing Sheets

UNIVERSAL SERIAL BUS TESTING DEVICE

CROSS REFERENCE TO RELATED APPLICATIONS

This Application claims priority of Taiwan Patent Application No. 102112455, filed on Apr. 9, 2013, the entirety of which is incorporated by reference herein.

TECHNICAL FIELD

The disclosure relates generally to Universal Serial Bus testing devices, and more particularly, to Universal Serial Bus testing devices for testing different USB standards.

BACKGROUND

The Universal Serial Bus (USB) is a serial bus standard for connecting a periphery device to a computer device, and is gradually replacing the serial or parallel ports of a computer device. With the development of USB technology, USB 2.0 and USB 1.1/1.0 are supported by the USB 3.0 interface. The USB 3.0 interface is designed to having 9 pins, wherein the USB 2.0 and USB 1.1/1.0 interfaces use the data transmission pins D+ and D− for data transmission, and USB 3.0 interface uses the data transmission pins Tx+, Tx−, Rx+ and Rx− for data transmission. Under this framework, the data transmission of the USB 2.0 interface and the data transmission of the USB 3.0 interface are independent and individual systems, and the data transmissions of the USB 3.0 and USB 2.0 do not influence each other. However, a USB port with the USB 3.0 interface is tested via a USB HUB to evaluate the USB 3.0, USB 2.0 and USB 1.1/1.0 function, such that the USB 3.0 interface and USB 2.0 interface are tested at the same time (i.e., the USB HUB is provided with a device module with the USB 3.0 interface and a device module with the USB 2.0 interface), whereby a computer device may easily crash or cause error. Therefore, testing for a single USB port of a computer or notebook has to use many USB testing devices individually for different USB interfaces.

SUMMARY

An embodiment of a universal serial bus (USB) testing device for an electronic device having a USB port, comprising: a micro-processor, receiving a power when the micro-processor is connected to a power port of the USB port; a first USB control unit, receiving the power from the micro-processor, and processing a first connection test for the electronic device via a first data port of the USB port; and a second USB control unit, receiving the power from the first USB control unit, and processing a second connection test for the electronic device via a second data port of the USB port, wherein when the first USB control unit receives the power, the first USB control unit provides the power to the second USB control unit after waiting for a first predetermined period of time, and the electronic device determines whether the first data port is operating according to the first connection test, and determines whether the second data port is operating according to the second connection test.

BRIEF DESCRIPTION OF DRAWINGS

The invention will become more fully understood by referring to the following detailed description with reference to the accompanying drawings, wherein.

DESCRIPTION OF EMBODIMENTS

In order to make the purposes, features and advantages of the present invention be understood more clearly, several preferred embodiments of the application are described. It is to be understood that the following disclosure provides various different embodiments as examples for implementing different features of the application. Specific examples of components and arrangements are described in the following to simplify the present disclosure. These are, of course, merely examples and are not intended to be limiting. Any alterations and modifications in the disclosed embodiments, and any further applications of the principles disclosed in this document are contemplated as would normally occur to one of ordinary skill in the pertinent art.

Figure 1:
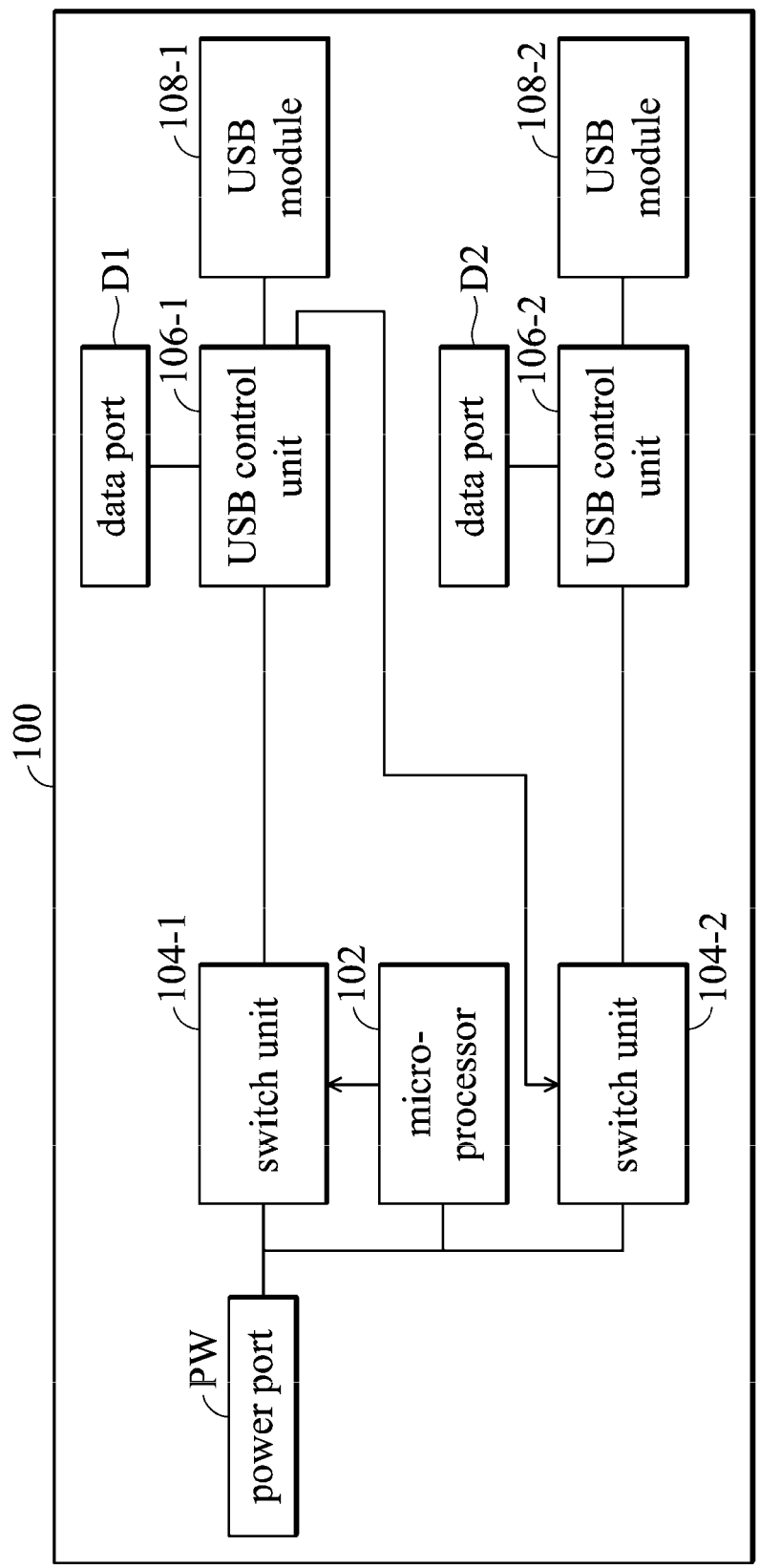
FIG. 1 is a block diagram illustrating an embodiment of a universal serial bus testing device.

FIG. 1 is a block diagram illustrating an embodiment of a universal serial bus testing device. The universal serial bus (named as USB hereafter) testing device 100 is configured to test electronic devices having a USB port with a USB 3.0 interface, such as computer devices, notebooks, or tablet computers. In an embodiment, the USB testing device 100 comprises a micro-processor 102, switch units 104-1, 104-2, USB control units (or USB Controllers) 106-1, 106-2, and USB modules 108-1, 108-2. The micro-processor 102 and the input terminals of the switch units 104-1, 104-2 are connected to the power port PW (such as VBUS power pin and GND ground pin) of the USB port of the tested electronic device. The output terminals of the switch units 104-1 and 104-2 are coupled to the USB control units 106-1 and 106-2, respectively. The output terminal of the micro-processor 102 is connected to the control terminal of the switch unit 104-1. The USB control unit 106-1 is connected to the switch unit 104-1, and may also be connected to the USB module 108-1, the control terminal of the switch unit 104-2, and the data port D1, respectively. In the embodiment, the data port D1 may be data transmission pins Tx+, Tx−, Rx+, and Rx− working under the USB 3.0 interface. The USB control units 106-2 is connected to the switch unit 104-2, and may also connected to the USB module 108-2 and the data port D2, respectively. In the embodiment, the data port D2 may be data transmission pins D+, and D− working under the USB 1.0/1.1 interface or USB 2.0 interface.

It should be note that, the data port D1, the data port D2 and the power port PW are illustrated separately for easy understanding. However, the data port D1, the data port D2 and the power port PW are arranged in a single USB port with a USB 3.0 interface. Namely, they are arranged in a single physical USB connector. In more detail, the data port D1, the data port D2 and the power port PW may be identified as a USB connector installed in the USB testing device, or be identified as a USB port installed in the electronic device. The data port D1 comprises data transmission pins Tx+, Tx−, Rx+, and Rx− working under the USB 3.0 interface for testing the USB 3.0, and the data port D2 comprises data transmission pins D+, and D− working under the USB 3.0 interface for testing the USB 1.0/1.1 or USB 2.0, and the power port PW comprises power transmission pins working under the USB 3.0 interface.

In the embodiment, the USB module 108-1 may be a card reader or a storage device with a USB 3.0 interface, such as memory cards or flash drives, and the USB control unit 106-1 may be a control unit working under the USB 3.0 interface protocol. The USB module 108-2 may be a mouse with a USB 1.0/1.1 interface or a storage device with a USB 2.0 interface, and the USB control unit 106-2 may be a control unit working under the USB 1.0/1.1 or USB 2.0 interface protocol.

When the USB testing device 100 is connected to the USB port of the electronic device (namely, the data port D1, the data port D2, and the power port PW of the USB connector is connected to the USB port of the electronic device, or the data port D1, the data port D2, and the power port PW are identified as the transmission pins corresponding to the USB port of the electronic device), the micro-processor 102 receives the power from the power port or power pins of the USB port of the electronic device. When the micro-processor 102 receives the power, the micro-processor 102 delays a period (ex. delays a second) and transmits a control signal to enable the switch unit 104-1. It should be noted that the delay time is used to prevent the USB port from accessing the data before the power port is connected properly. When the switch unit 104-1 is turned on, the power of a power source is provided to the USB control unit 106-1, then the USB control unit 106-1 may perform a test for USB 3.0 to the electronic device via the USB connector or the data port D1 (data transmission pins Tx+, Tx−, Rx+, and Rx−) of the USB port. For example, the electronic device may determine whether the data port D1 of the USB port is operating according to whether a USB device is connected thereto or not. As it is a well-known technique to determine whether a USB device is connected to an electronic device or not, it is not described further.

Next, if the data port D1 of the USB connector works, the USB control unit 106-1 processes a handshaking procedure with the electronic device, such that the electronic device can receive or transmit data in the USB module 108-1. Therefore, the electronic device can process a read/write test for determining whether the data port D1 of the USB port or the USB connector is operating correctly or not.

It should be noted that, when it is determined that the data port D1 of the USB port or the USB connector works, the USB control unit 106-1 transmits a control signal to the switch unit 104-2 for turning on (enable) the switch unit 104-2, so that the power of the power source is provided to the USB control unit 106-2. Next, the USB control unit 106-2 may perform a USB 1.0/1.1 or USB 2.0 test for the electronic device via a data port D2 (data transmission pins D+, and D−) of the USB port. Similarly, if the data port D2 of the USB connector works, the USB control unit 106-2 processes a handshaking procedure with the electronic device, such that the electronic device can receive or transmit data in the USB module 108-2. Therefore, the electronic device can process a read/write test for determining the data port D2 of the USB port or the USB connector is operating correctly or not. In a specific embodiment, after the USB control unit 106-1 processes a handshaking procedure with the electronic device, the USB control unit 106-1 transmits a control signal to the switch unit 104-2.

In should be noted that, the USB control unit 106-1 may delays a period by determining whether the data port D1 of the USB port or the USB connector work or processing the handshaking procedure. Due to the power of the power source being provided to the USB control unit 106-2 (via switch unit 104-2) after being delayed for the period of time above, error which is caused by that the USB control unit 106-1 and USB control unit 106-2 performs a connection test for the electronic device at the same time, does not occur. Also, the USB control unit 106-2 can process a connection test after the USB control unit 106-1 processes a connection test, so the testing of the USB port of the electronic device is sped up.

Figure 2:
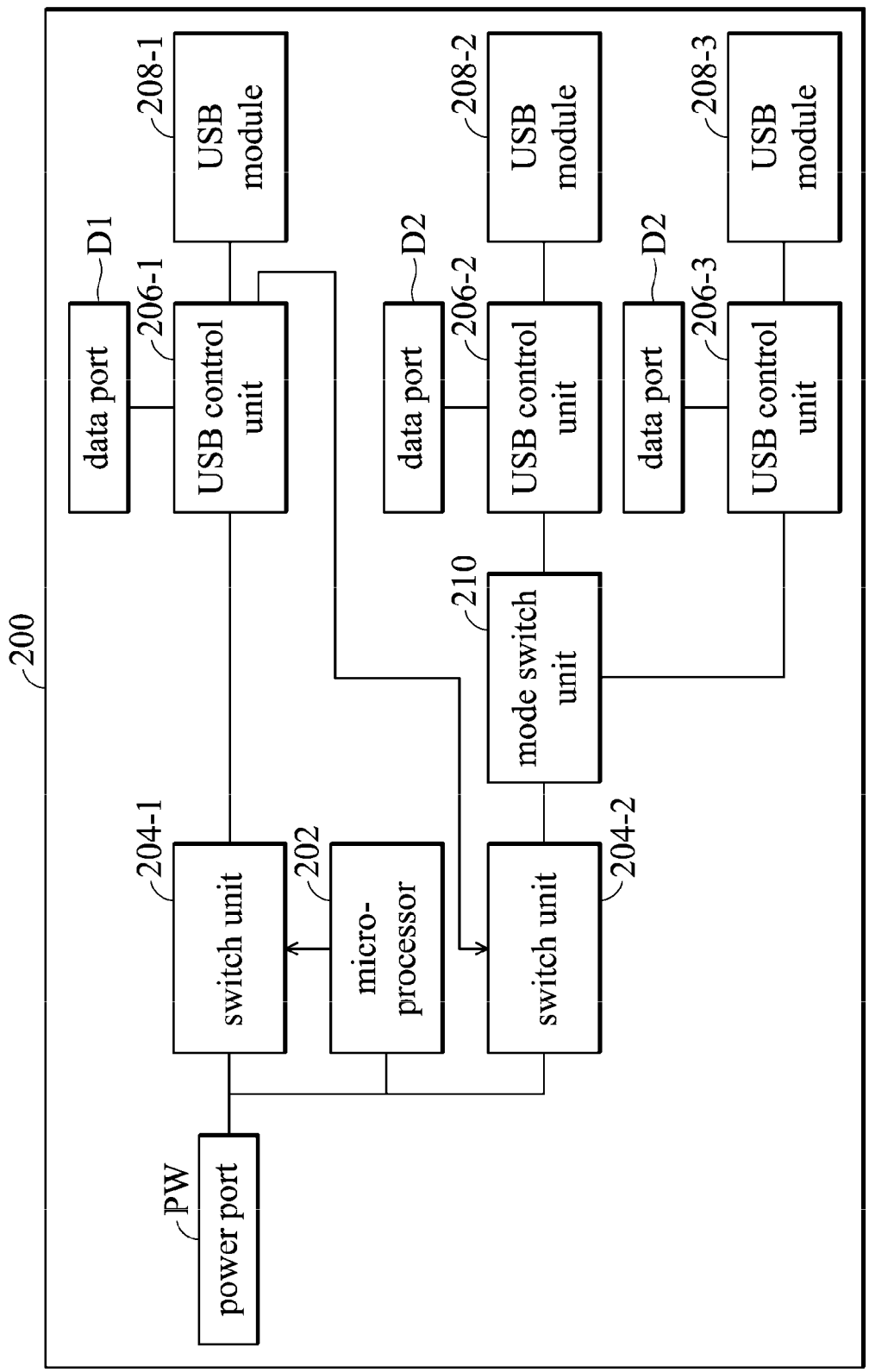
FIG. 2 is a block diagram illustrating another embodiment of a USB testing device according to the invention.

FIG. 2 is a block diagram illustrating another embodiment of a USB testing device according to the invention. Due to both the USB 2.0 and USB 1.1/1.0 using the same data transmission pins (data port D2) for transmission, the embodiment of FIG. 1 may not test whether the data transmission of the USB 2.0 and USB 1.1/1.0 work at the same time. In order to test the USB 2.0 and USB 1.1/1.0 more conveniently, the USB testing device 200 of the embodiment is added a mode switch unit 210, a USB control unit 206-3 and a USB module 208-3.

In the embodiment of FIG. 2, the output terminal of the switch unit 204-2 is connected to the mode switch unit 210. The USB control unit 206-2 is connected to the mode switch unit 210, the USB module 208-2 and the data port D2. Similarly, the USB control unit 206-3 is connected to the mode switch unit 210, the USB module 208-3 and the data port D2.

Similarly, although the data port D1, the data port D2 and the power port PW are illustrated separately, the data port D1, the data port D2 and the power port PW are arranged in a single USB port with a USB 3.0 interface, or arranged in a USB port of the electronic device as corresponding transmission pins.

In the embodiment, the USB control unit 206-1 is a USB 3.0 accessing control unit, the USB control unit 206-2 is a USB 2.0 accessing control unit, and the USB control unit 206-3 is a USB 1.0 or USB 1.1 accessing control unit. In the embodiment, the USB module 208-1 may be a card reader or a storage device with a USB 3.0 interface, such as memory cards or flash drives. The USB module 208-2 may be a storage device with a USB 2.0 interface, and the USB module 208-3 may be a mouse or a storage device with a USB 1.0/1.1 interface.

The mode switch unit 210 added in FIG. 2 can electrically connect the output terminal of the switch unit 204-2 to the USB control unit 206-2 or the USB control unit 206-3 for selecting the testing of transmission of the USB 2.0 or USB 1.1/1.0.

When a user makes the mode switch unit 210 electrically connect to the USB control unit 206-2, the operation procedure is similar to the operation procedure of the embodiment of FIG. 1. The difference is that the data port D2 in the embodiment of FIG. 2 is used for testing USB 2.0 only. In more detail, when it is determined that the data port D1 of the USB port or the USB connector works, the USB control unit 206-1 transmits a control signal to the switch unit 204-2 for turning on (enable) the switch unit 204-2. Because the mode switch unit 210 is electrically connected to the USB control unit 206-2, the power of the power source is only provided to the USB control unit 206-2, and then the testing of the USB 2.0 is performed.

When a user makes the mode switch unit 210 electrically connect to the USB control unit 206-3, the data port D2 is used for testing USB 1.0/1.1. In more detail, when it is determined that the data port D1 of the USB port or the USB connector works, the USB control unit 206-1 transmits a control signal to the switch unit 204-2 for turning on (enable) the switch unit 204-2. Because the mode switch unit 210 is electrically connected to the USB control unit 206-3, the power of the power source is only provided to the USB control unit 206-3, and then the testing of the USB 1.0/1.1 is performed.

Figure 3:
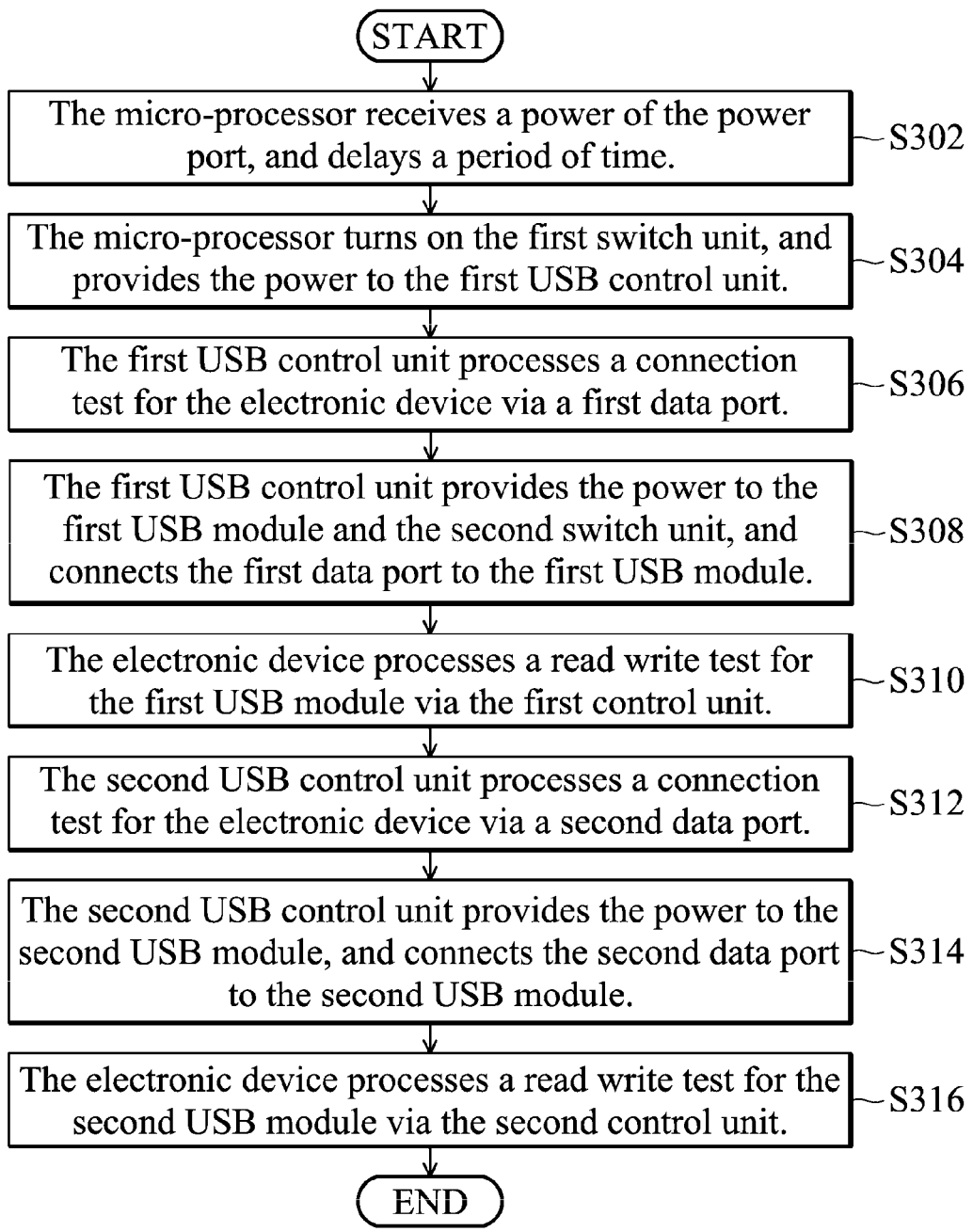
FIG. 3 is the operation flowchart of an embodiment of a method for the Universal Serial Bus testing device shown in FIG. 1.

FIG. 3 is a flowchart of an embodiment of a method for the USB testing device shown in FIG. 1. In step S302, when the micro-processor 102 receives a power source from an electronic device, the micro-processor 102 delays a period (ex.

delays a second). In step S304, the micro-processor 102 turns on the first switch unit (the switch unit 104-1), so that the power of the power source is provided to the first USB control unit (the USB control unit 106-1).

In step S306, after the first USB control unit receives the power, the first USB control unit processes a connection test for the electronic device via a first data port (the data port D1). If the connection test of the first data port is normal, in step S308, the first USB control unit provides a control signal to a control terminal of a second switch unit (the switch unit 104-2) for turning on the second switch unit, and the power of the power source is provided to the second USB control unit (106-2). In a specific embodiment, the first USB interface is a USB 3.0 interface.

In step S310, the electronic device processes a read/write test for the first USB module (USB module 108-1) via the first control unit. Next, in step S312, the second USB control unit processes a connection test for the second data port (data port D2) via the second port (data port D2). If the connection test of the second data port is normal, in step S314, the electronic device processes a read/write test for the second USB module (USB module 108-2) via the second control unit. In a specific embodiment, the second USB interface is a USB 2.0 or USB 1.1/1.0 interface.

It should be noted that, although the electronic device processes a read/write test for the first USB module in step S310, the electronic device may still be processing the read/write test in step S312. This means that although the procedure proceeds to the steps S312-S316, the electronic device may continue processing the read/write test for the first USB module until the test is finished. Therefore, the test time can be reduced.

The operation procedure of the USB testing device 200 shown in FIG. 2 is similar to the operation procedure shown in FIG. 3. The difference is that, if the mode switch unit 210 electrically connects the output terminal of the switch unit 204-2 to the second USB control unit, the power of the power source is provided to the second USB control unit. If the mode switch unit 210 electrically connects the output terminal of the switch unit 204-2 to the third USB control unit, the power of the power source is provided to the third USB control unit. Next, in the steps S310 to S314, the second USB control unit or the third USB control unit, which receives the power, processes a connection test for the electronic device, and the second USB module corresponding the second control unit or the third USB module corresponding the third control unit, processes the read/write test.

The illustrative method shows exemplary steps, but they are not necessarily performed in the order shown. Steps may be added, replaced, changed order, and/or eliminated as appropriate, in accordance with the spirit and scope of the disclosed embodiments.

Each claim of this document constitutes a separate embodiment, and embodiments that combine different claims and/or different embodiments are within the scope of the disclosure and will be apparent to those of ordinary skill in the art after reviewing this document.

What is claimed is:

1. A universal serial bus (USB) testing device for an electronic device having a USB port, comprising:
a micro-processor, receiving a power when the micro-processor is connected to a power port of the USB port;
a first USB control unit, receiving the power from the micro-processor, and processing a first connection test for the electronic device via a first data port of the USB port; and
a second USB control unit, receiving the power from the first USB control unit, and processing a second connection test for the electronic device via a second data port of the USB port,
wherein when the first USB control unit receives the power, the first USB control unit provides the power to the second USB control unit after waiting for a first predetermined period of time, and
wherein the electronic device determines whether the first data port is operating according to the first connection test, and determines whether the second data port is operating according to the second connection test.

2. The USB testing device of claim 1, wherein when the micro-processor connects to the power port of the USB port, the micro-processor provides the power to the first USB control unit after waiting for a second predetermined period of time.

3. The USB testing device of claim 1, further comprising:
a first USB module, connected to the first USB control unit,
wherein when the first USB control unit finishes the first connection test, the first USB control unit processes a first read/write test for the first USB module via the first USB control unit.

4. The USB testing device of claim 1, further comprising:
a second USB module, connected to the second USB control unit,
wherein when the second USB control unit finishes the second connection test, the second USB control unit processes a second read/write test for the second USB module via the second USB control unit.

5. The USB testing device of claim 1, further comprising:
a first switch unit, coupled between the power port of the USB port and the first USB control unit,
wherein the micro-processor provides the power to the first USB control unit by turning on the first switch unit.

6. The USB testing device of claim 5, further comprising:
a second switch unit, coupled between the power port of the USB port and the second USB control unit,
wherein the first USB control unit provides the power to the second USB control unit by turning on the second switch unit.

7. The USB testing device of claim 5, further comprising:
a second switch unit, having an input terminal and an output terminal, wherein the input terminal is coupled to the power port of the USB port;
a third USB control unit, processing a third connection test for the electronic device via the second data port of the USB port when receiving power; and
a mode switch unit, coupled to the second USB control unit, the third USB control unit and the second switch unit, and selectively connecting the output terminal of the second switch unit to the second USB control unit or the third USB control unit.

8. The USB testing device of claim 7, wherein when the mode switch unit connects the output terminal of the second switch unit to the second USB control unit, the first USB control unit provides the power to the second USB control unit by turning on the second switch unit, and when the mode switch unit connects the output terminal of the second switch unit to the third USB control unit, the first USB control unit provides the power to the third USB control unit by turning on the second switch unit.

9. The USB testing device of claim 8, wherein the first USB control unit is a USB 3.0 access control unit, the second USB control unit is a USB 2.0 access control unit, and the third USB control unit is a USB 1.0 access control unit or a USB 1.1 access control unit.

10. The USB testing device of claim 1, wherein the first USB control unit is a USB 3.0 access control unit, and the second USB control unit is a USB 2.0 access control unit or a USB 1.1/1.0 access control unit.

* * * * *